(12) United States Patent
Itoh et al.

(10) Patent No.: US 7,720,151 B2
(45) Date of Patent: May 18, 2010

(54) MOTION ESTIMATION USING EARLY DECISION FOR GOODNESS OF ESTIMATION WITH QUICK CONVERGENCE FEEDBACK

(75) Inventors: Yuji Itoh, Ibaraki (JP); Ho-Cheon Wey, Ibarki (JP); Ngai-Man Cheung, Los Angeles, CA (US)

(73) Assignee: Texas Instruments Incorporated, Dallas, TX (US)

( * ) Notice: Subject to any disclaimer, the term of this patent is extended or adjusted under 35 U.S.C. 154(b) by 2183 days.

(21) Appl. No.: 10/364,094

(22) Filed: Feb. 11, 2003

(65) Prior Publication Data

US 2004/0156435 A1      Aug. 12, 2004

(51) Int. Cl.
*H04N 7/12*      (2006.01)
(52) U.S. Cl. .................................. 375/240.16
(58) Field of Classification Search ................................
375/240.01–240.07, 240.12–240.17, 240.26,
375/240.24
See application file for complete search history.

(56) References Cited

U.S. PATENT DOCUMENTS

| 5,677,735 | A | * | 10/1997 | Ueno et al. | ............ | 375/240.15 |
| 6,473,529 | B1 | * | 10/2002 | Lin | ............................. | 382/236 |
| 6,567,469 | B1 | * | 5/2003 | Rackett | .................. | 375/240.16 |
| 6,760,478 | B1 | * | 7/2004 | Adiletta et al. | .............. | 382/236 |
| 6,876,703 | B2 | * | 4/2005 | Ismaeil et al. | ........... | 375/240.16 |
| 6,907,080 | B1 | * | 6/2005 | Aldrich | .................. | 375/240.26 |
| 6,990,148 | B2 | * | 1/2006 | Yang | ..................... | 375/240.16 |
| 7,031,389 | B2 | * | 4/2006 | Guevorkian et al. | ..... | 375/240.16 |
| 7,072,398 | B2 | * | 7/2006 | Ma | ........................ | 375/240.16 |
| 7,151,798 | B2 | * | 12/2006 | Chen et al. | ............. | 375/240.16 |
| 2001/0002205 | A1 | * | 5/2001 | Beattie | .................. | 375/240.12 |

* cited by examiner

*Primary Examiner*—David Czekaj
(74) *Attorney, Agent, or Firm*—Robert D. Marshall, Jr.; W. James Brady; Frederick J. Telecky, Jr.

(57) ABSTRACT

This invention is a method for speeding up block matching based motion estimation for video encoder. The invention 1) calculates statistics for a candidate motion vector for a predetermined fraction of the pixels of a macroblock, 2) makes an early decision based on this preliminary cost function, and 3) terminates the block matching process without calculating the cost function for other pixels if the preliminary cost function is not less than a predetermined threshold. This early decision for goodness estimation provides an economy of processing load when a large portion of data is left untouched (i.e. unprocessed). The present invention employs feedback control to reduce the predetermined threshold for quick convergence upon each detection of a better match.

12 Claims, 5 Drawing Sheets

FIG. 6

MOTION ESTIMATION USING EARLY DECISION FOR GOODNESS OF ESTIMATION WITH QUICK CONVERGENCE FEEDBACK

TECHNICAL FIELD OF THE INVENTION

The technical field of this invention is signal compression employing block matching operations.

BACKGROUND OF THE INVENTION

Moving pictures such as video are composed of a number of consecutive frames of still pictures. In the NTSC (National Television Standards Committee) conventional television system each second includes 30 frames or 60 fields. Consecutive frames are generally similar except for changes caused by moving objects. Video coding experts call this similarity temporal redundancy. In the digital video compression temporal redundancy enables a major improvement in coding efficiency. Thus digital television can transmit 4 to 6 channels over an equivalent analog channel of the same capacity. The temporal redundancy reduction in digital video compression is achieved by motion compensation (MC). Using motion compensation the current picture can be modeled as a translation of prior pictures.

In the MPEG video coding standard employed in most of today's digital video applications, each picture is divided into two-dimensional macroblocks of M horizontal by N vertical pixels. In the MPEG video coding standard M and N are both set to 16. Each macroblock in the current frame is predicted from a previous or future frame called the reference frame by estimating the amount of the motion in the macroblock during the frame time interval. The MPEG video coding syntax specifies how to represent the motion information for each macroblock in vectors. This standard does not specify how these motion vectors are to be computed.

Due to the block-based motion representation, many implementations of MPEG video coding use block matching techniques. The motion vector is obtained by minimizing a cost function measuring the mismatch between the reference and the current macroblocks. The most widely-used cost function is the sum of absolute difference values (AE) defined as:

$$AE_{k,d} \equiv \sum_{j=0}^{N-1} \sum_{i=0}^{M-1} |f_t + \tau(x_k + d_h + i, y_k + d_v + j) - f_t(x_k + i, y_k + j)| \quad \text{Eq. 1}$$

This equation represents the absolute difference where: d is the displacement ($d_h$, $d_v$) for the macroblock whose left-upper corner pixel is denoted by $f_t(x\_,y\_)$; $f_{t+}$(h,v) is the pixel at coordinates (h,v) in the reference frame; $\tau$ is the frame distance between the current frame and the reference frame. An alternate cost function is the sum of squared error values. This is defined as:

$$SE_{k,d} \equiv \sum_{j=0}^{N-1} \sum_{i=0}^{M-1} (f_t + \tau(x_k + d_h + i, y_k + d_v + j) - f_t(x_k + i, y_k + j))^2 \quad \text{Eq. 2}$$

Figure 1:
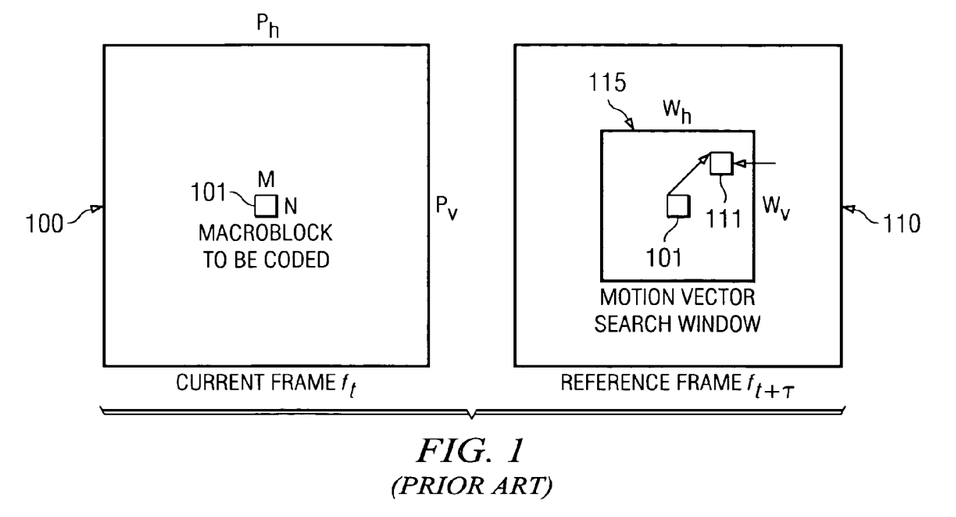
FIG. 1 illustrates an example of block matching based motion estimation according to the prior art.

FIG. 1 illustrates the block matching process. Current frame 100 includes macroblock 101 having a size M by N. Reference frame 110 includes macroblock to be predicted 111 which is displaced by motion vector d from the corresponding position of macroblock 101.

Finding the motion vector d among the motion vector search window denoted by $W_h \times W_v$ that minimizes the absolute difference for each macroblock is called motion estimation (ME). Using the motion vector d, motion-compensated residual signals denoted by g(x_+i, y_+j), where $0 \leq i \leq M-1$, $0 \leq j \leq N-1$ are coded through successive transform coding process such as Discrete Cosine Transform (DCT) are expressed as:

$$g(x_k+i,y_k+j) \equiv f_t(x_k+i,y_k+j) - f_{t+\tau}(x_k+d_h+i,y_k+d_v+j) \quad \text{Eq. 3}$$

From equation 2 the best match minimizes the number of significant, i.e. non-zero, signals to be coded. This leads to a best coding gain among all possible matches.

Video coding standards such as MPEG do not specify how the motion estimation should be performed. The system designer decides how to implement among many possible ways. A common prior art technique employs a full search (FS) over a wide 2-dimensional area yields the best matching results in most cases. This assurance comes at a high computational cost to the encoder. In fact motion estimation is usually the most computationally intensive portion of the video encoder.

Figure 2:
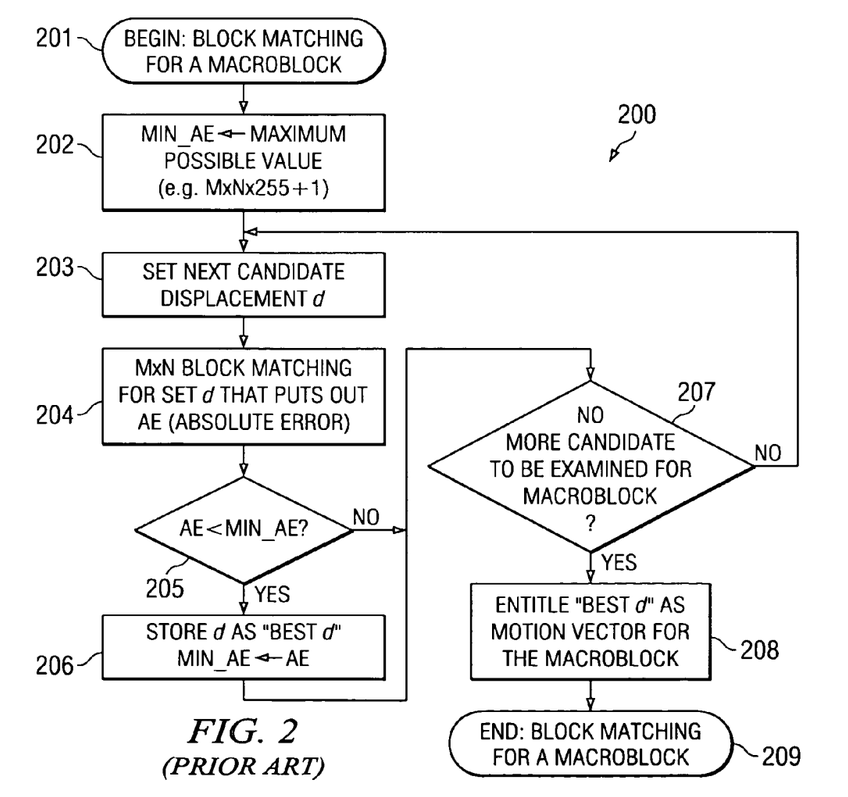
FIG. 2 is a flowchart of a block matching algorithm according to the prior art.

FIG. 2 illustrates the flowchart 200 of the prior art full search plain block matching. This block matching determines which candidate motion vector d provides the best match between the current macroblock and the reference frame. The process begins with start block 201. Block 202 initializes a variable AE_MIN correspond to the cost function minimum to a saturated value, the maximum possible value. Block 203 selects the next candidate motion vector d. Block 204 computes the cost function for the current macroblock at the current candidate motion vector d. This is typically the absolute difference (AE) of equation 1. Decision block 205 tests to determine if the new absolute difference AE is less than the prior cost function minimum AE_MIN. If this is the case (Yes at decision block 205), then the current candidate motion vector d yields a better cost function than the previous best. Thus block 206 stores the current candidate motion vector d as the best motion vector and replaces the prior cost function minimum AE_MIM with the current cost function AE. Decision block 207 tests to determine if there are no more candidate motion vectors. If there are additional candidate motion vectors (No at decision block 207), process flow returns to block 203. Block 203 begins a repeat for the next candidate motion vector d. If the new absolute difference AE is not less than the prior cost function minimum (No at decision block 205), then the current candidate motion vector d does not yield a better cost function than the previous best. Process 200 branches ahead to decision block 207. If there are no additional candidate motion vectors (Yes at decision block 207), then the best motion vector d for the current macroblock has been found. Block 208 confirms the current candidate motion vector d is the best motion vector for the current macroblock. Process 200 ends at end block 209.

The computational complexity of the motion estimation is usually represented with in the units of summation of absolute difference (SAD). One match computation between a current macroblock and one candidate reference macroblock each having M by N pixels requires M×N SAD. Here let $SAD_{mb}$ denote SAD for a macroblock with search window denoted by $W_h \times W_v$, which is represented as:

$$SAD_{mb} = M \times N \times W_h \times W_v \quad \text{Eq. 4}$$

Then SAD for a frame denoted by $SAD_{frame}$ is expressed as:

$$\begin{aligned} SAD_{frame} &= SAD_{mb} \times \text{number of macroblocks} \quad \text{Eq. 5}\\ &= M \times N \times W_h \times W_v \times (P_h \times P_v)/(M \times N)\\ &= W_h \times W_v \times (P_h \times P_v) \end{aligned}$$

This $SAD_{frame}$ calculation assumes only one prediction mode and one prediction direction. However, in many cases there are two or three prediction modes and both forward and backward prediction are employed. For SDTV (Standard Definition TV) quality service, the full search motion estimation requires 100 GOPS (Giga Operations Per Second, Giga: $10^9$) to 200 GOPS of SAD. Meanwhile all the encoder modules except the motion estimation only take about 1 GOPS or only 1% as much processing. Thus much effort has been made to reduce this SAD number down to a practical level.

Several algorithms have been proposed to reduce the number of candidate motion vectors that must be considered.

The Q-step search algorithm first evaluates the cost function at the center and eight surrounding locations of certain area. This area is typically a 32 pixel by 32 pixel block. The location that produces the smallest cost function becomes the center of the next stage. The search range is reduced, generally by half, and the search repeated. This sequence is repeated Q times. Typically $2 \leq Q \leq 4$.

In a sub-sampling based search both current and reference frames are sub-sampled with an adequate decimation factor. This decimation factor is usually 2 or 4 for horizontal and vertical directions. In a first iteration, the computation of the cost function is performed in that sub-sampled domain. This yields a coarse motion vector. For successive iterations, the coarse motion vector is refined by conducting the matching over domain with a smaller decimation factor.

A telescopic search exploits the motion information in adjacent frames to reduce the computational cost. The rationale behind this approach is that the movement of objects in video is continuous, so the motion information in adjacent frames is correlated. Thus the motion vector of the previous frame provides information relevant to the motion vector of the current frame. Among various implementations a simple instantiation is to use the motion vector of the previous frame as an offset, that is, the center of the search window. This helps find the best matches with a relatively small search window.

Many digital video encoders use one of these three algorithms or their families. Some use a mixture of these, such as a sub-sampling based search together with a telescopic search. It has been empirically found that well tuned motion estimation algorithms take only 2% to 3% of the computation that the full search algorithm requires. This benefit typically sacrifices little visual quality. These tailored methods are complicated and tend to require additional resources such as a memory buffer. Even having achieved such significant complexity reduction, the motion estimation is still the most computationally intensive part of video coding. The motion estimation often requires operations 5 times that of the entire rest of the modules. Therefore further reduction of computational complexity is desired while preserving visual quality and increases implementation complexity as little as possible.

SUMMARY OF THE INVENTION

A method of block matching based motion estimation calculates a preliminary cost function between a predetermined fraction of pixels in a candidate macroblock as displaced by a candidate motion vector and the corresponding pixels of reference frame. If this preliminary cost function is not less than a predetermined threshold, the method considers the next candidate motion vector. If this preliminary cost function is less than the predetermined threshold, the method calculates a final cost function for all pixels in the macroblock. If this final cost function is not less than the prior cost function minimum, considers the next candidate motion vector. If this final cost function is less than the prior cost function minimum, the method sets the current candidate motion vector as the best candidate motion vector and sets the prior cost function minimum to the final cost function minimum, then considers the next candidate motion vector. Upon consideration of all candidate motion vectors, the method sets a motion vector for the macroblock to the best candidate motion vector. The prior cost function minimum is initialized to a maximum value. The predetermined fraction of pixels in the candidate macroblock may be in the range between 12.5% and 30%.

This method may be used with a full search of all candidate motion vectors, a Q-step search, a sub-sampling search or telescopic search of possible motion vectors.

Another embodiment of this invention updates the predetermined threshold upon each determination of that the final cost function is less than said prior cost function minimum. This update takes the form of product of the final cost function, the predetermined fraction and a safe margin factor greater than 1. The safe margin factor may have a value between 1.00 and 1.25.

BRIEF DESCRIPTION OF THE DRAWINGS

These and other aspects of this invention are illustrated in the drawings, in which.

DETAILED DESCRIPTION OF PREFERRED EMBODIMENTS

Figure 3:
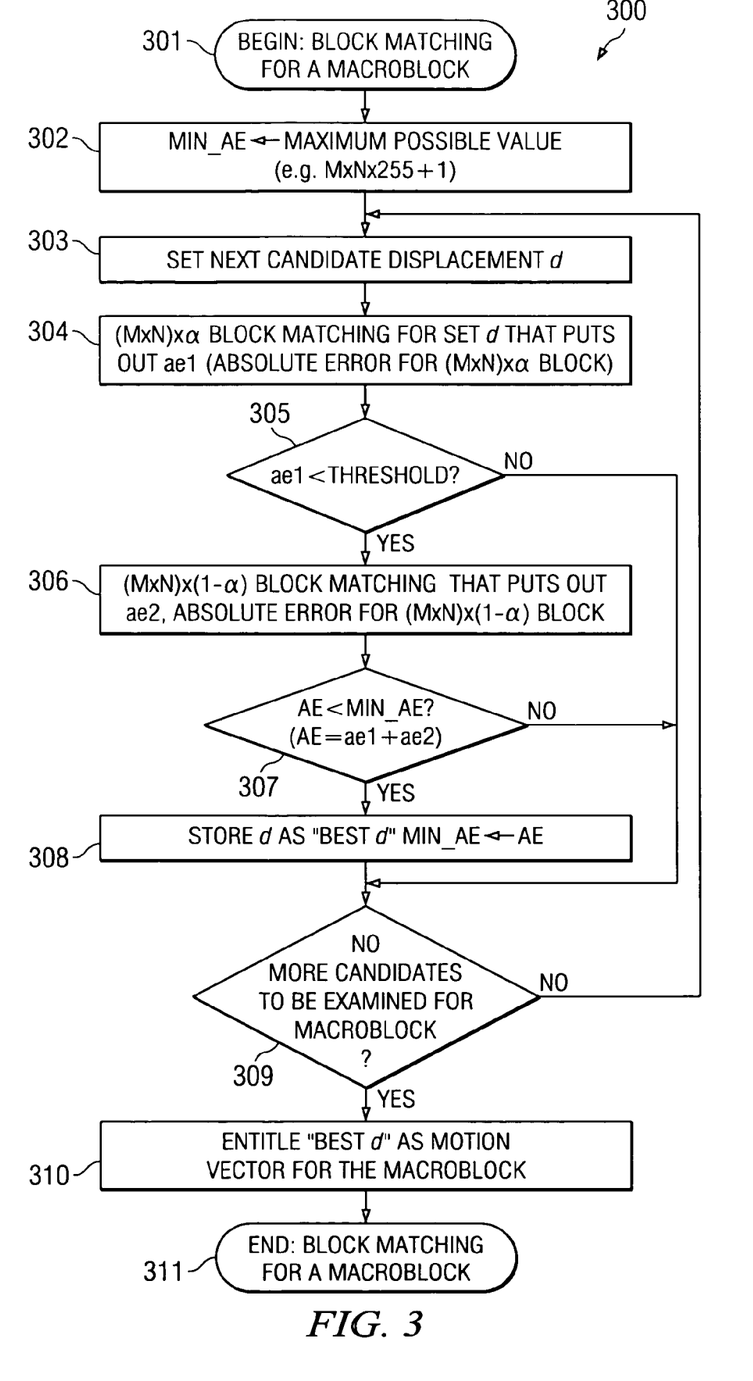
FIG. 3 a flowchart of a block matching algorithm using early decision for goodness estimation according to a first embodiment of this invention.

FIG. 3 illustrates the flowchart 300 of a block matching with an early decision for goodness estimation (EDGE). The process begins with start block 301. Block 302 initializes a variable AE_MIN to the cost function minimum to a saturated value, the maximum possible value. Block 303 selects the next candidate motion vector d. Block 304 computes a part of the cost function for the current macroblock at the current candidate motion vector d. This cost function calculation is done for a fraction $\alpha$ of the M by N pixel macroblock, with $0<\alpha<1$. The result of calculation of the cost function for part of the macroblock is ae1. Decision block 305 tests to determine if ae1 is less than a threshold. If ae1 is not less than the threshold (No at decision block 305), then process 300 branches forward to decision block 309 to check for more candidate motion vectors. If ae1 is less than the threshold (Yes at decision block 305), then block 306 computes the cost function for the 1−α remaining pixels. This yields a cost function result ae2. Decision block 307 checks to determine if the cost function AE for the entire macroblock (AE=ae1+ae2) is less than the prior cost function minimum AE_MIN. If this is the case (Yes at decision block 307), then the current candidate motion vector d yields a better cost function than the previous best. Thus block 308 stores the current candidate motion vector d as the best candidate motion vector and replaces the prior cost function minimum AE_MIM with the current cost function AE. If the new absolute difference AE is not less than the prior cost function minimum (No at decision block 307), then the current candidate motion vector d does not yield a better cost function than the previous best. Process 300 branches ahead to decision block 309. Decision block 309 tests to determine if there are no more candidate motion vectors. If there are additional candidate motion vectors (No at decision block 309), process flow returns to block 303. Block 303 begins a repeat for the next candidate motion vector d. If there are no additional candidate motion vectors (Yes at decision block 309), then the best candidate motion vector d for the current macroblock has been found. Block 310 confirms the current candidate motion vector d is the best motion vector for the current macroblock. Process 300 ends at end block 311.

The EDGE process assumes that instead of conducting a matching for all samples of the macroblock, one may be able to predict the cost function AE for the entire macroblock from a portion of the macroblock. This attempts to make a decision whether the current candidate motion vector d will be the best based on projected values at an earlier stage. Assuming a is set to 0.30, then computation of the entire cost function for as many as 65% of total macroblocks is unnecessary. These macroblocks fail the test of decision block 305 (No at decision block 305) Thus only 35% of the macroblocks need to be fully checked. This leads to a reduction on the processing load of 45.5% (0.7×0.65) because it saves 70% (1−α) of the processing of 65% of the macroblocks.

Figure 4:
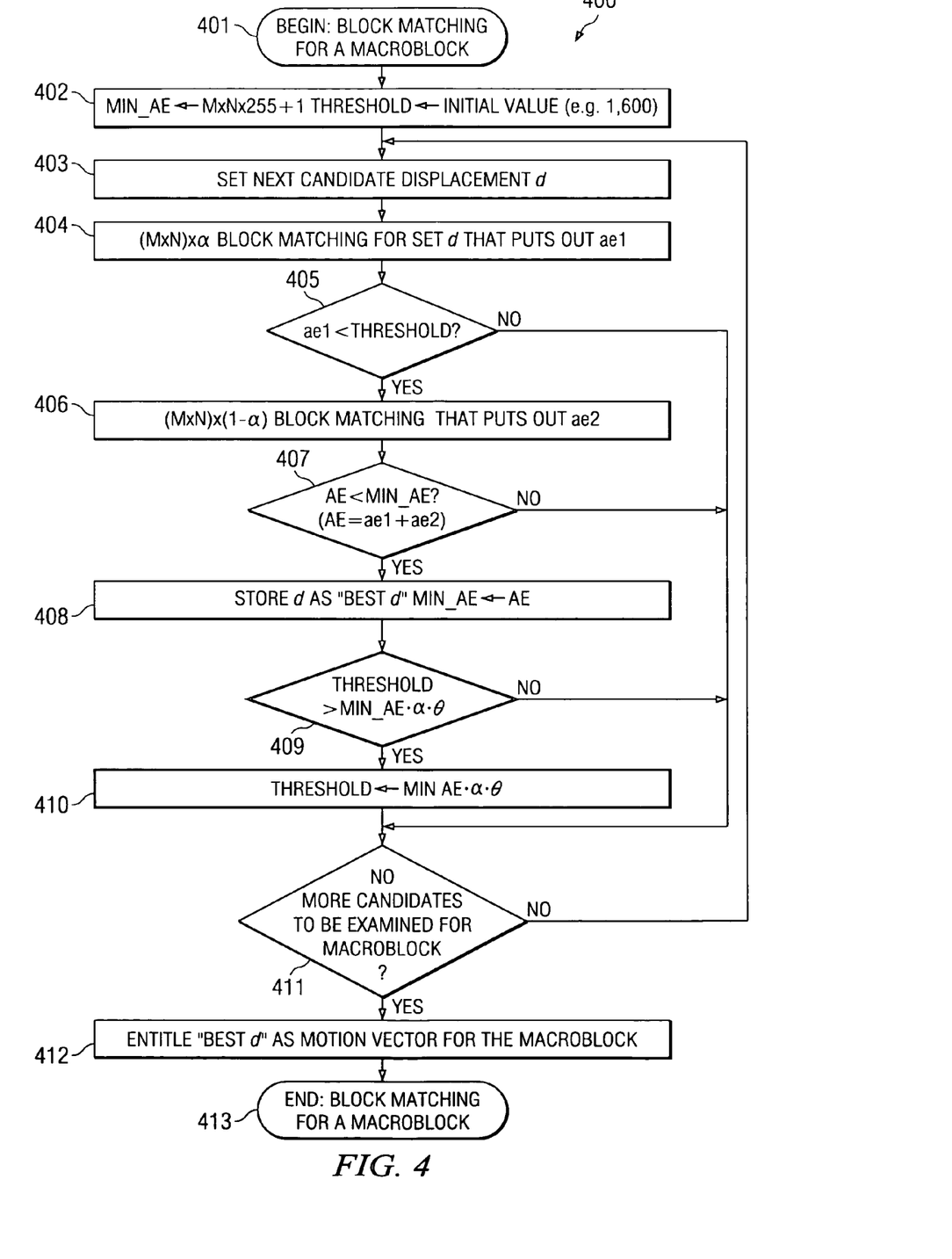
FIG. 4 is a flowchart of block matching algorithm using early decision for goodness estimation and quick convergence feedback according to a second embodiment of this invention.

FIG. 4 illustrates an improved EDGE based block matching process 400 including quick convergence feedback. The process begins with start block 401. Block 402 initializes a variable AE_MIN to the cost function minimum to a saturated value, the maximum possible value. Block 403 selects the next candidate motion vector d. Block 404 computes a part of the cost function for the current macroblock at the current candidate motion vector d. This cost function calculation is done for a fraction a of the M by N pixel macroblock, with $0<\alpha<1$. The result of calculation of the cost function for part of the macroblock is ae1. Decision block 405 tests to determine if ae1 is less than a threshold. If ae1 is not less than the threshold (No at decision block 405), then process 400 branches forward to decision block 411 to check for more candidate motion vectors. If ae1 is less than the threshold (Yes at decision block 405), then block 406 computes the cost function for the 1−α remaining pixels. This yields a cost function result ae2. Decision block 407 checks to determine if the cost function AE for the entire macroblock (AE=ae1+ae2) is less than the prior cost function minimum AE_MIN. If this is the case (Yes at decision block 407), then the current candidate motion vector d yields a better cost function than the previous best. Thus block 408 stores the current candidate motion vector d as the best candidate motion vector and replaces the prior cost function minimum AE_MIM with the current cost function AE. Decision block 409 tests to determine if a predetermined threshold is greater than the product of the cost function minimum AE_MIN, α and a factor θ, where $\theta \geq 1$. If this is the case (Yes at decision block 409), the threshold is reset to the product of AE_MIN, α and θ (block 410). Process 400 continues with decision block 411. If this is not the case (No at decision block 409), then process 400 continues with decision block 411. If the new absolute difference AE is not less than the prior cost function minimum (No at decision block 407), then the current candidate motion vector d does not yield a better cost function than the previous best. Process 400 branches ahead to decision block 411.

Decision block 411 tests to determine if there are no more candidate motion vectors. If there are additional candidate motion vectors (No at decision block 411), process flow returns to block 403. Block 403 begins a repeat for the next candidate motion vector d. If there are no additional candidate motion vectors (Yes at decision block 411), then the best motion vector for the current macroblock has been found. Block 412 confirms the current candidate motion vector is the best motion vector for the current macroblock. Process 400 ends at end block 413.

Process 400 includes quick convergence feedback. Each time a candidate motion vector d produces a new minimum cost function MIN_AE, the quick convergence feedback updates the threshold. The threshold used in decision block 405 is initially set to a pre-defined value. This will be empirically determined based on experiments with similar video. In a plain EDGE process 300 illustrated in FIG. 3, this threshold remains the same during the whole process. Process 400 updates this threshold through quick convergence feedback if MIN_AE is updated and if MIN_AE satisfies the following condition threshold>MIN_AE*α*θ, where $\theta \geq 1$. Suitable values for θ are between 1.00 and 1.25. The factor θ provides a safe margin to prevent over disqualification. When these conditions are met, the threshold value is updated threshold=MIN_AE*α*θ. Using this quick convergence feedback, the threshold value adapts to the probability distribution of the similarity measure.

Figure 5A:
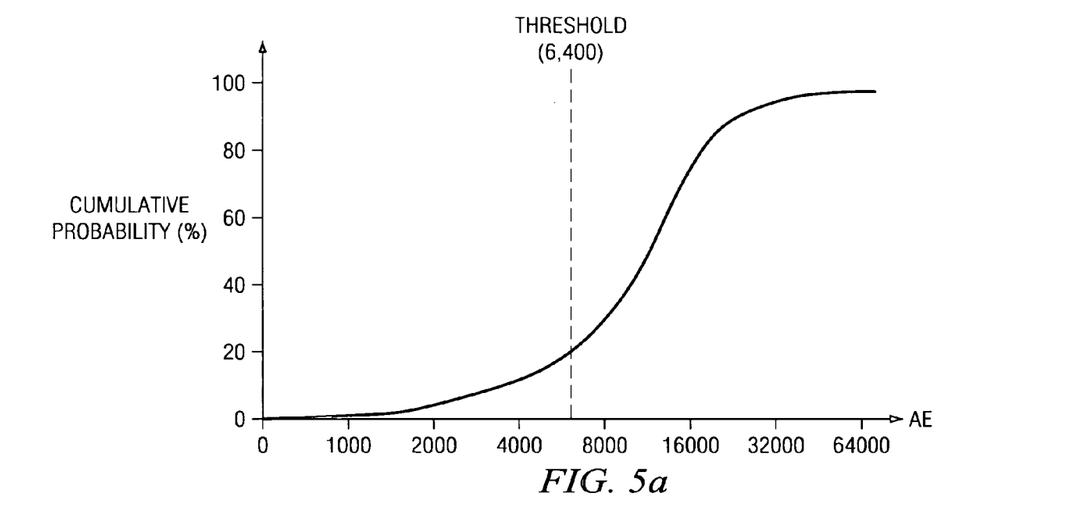
FIGS. 5a and 5b illustrate the cumulative probability percentage versus absolute error value for respective "good" and "bad" distributions.
Figure 5B:
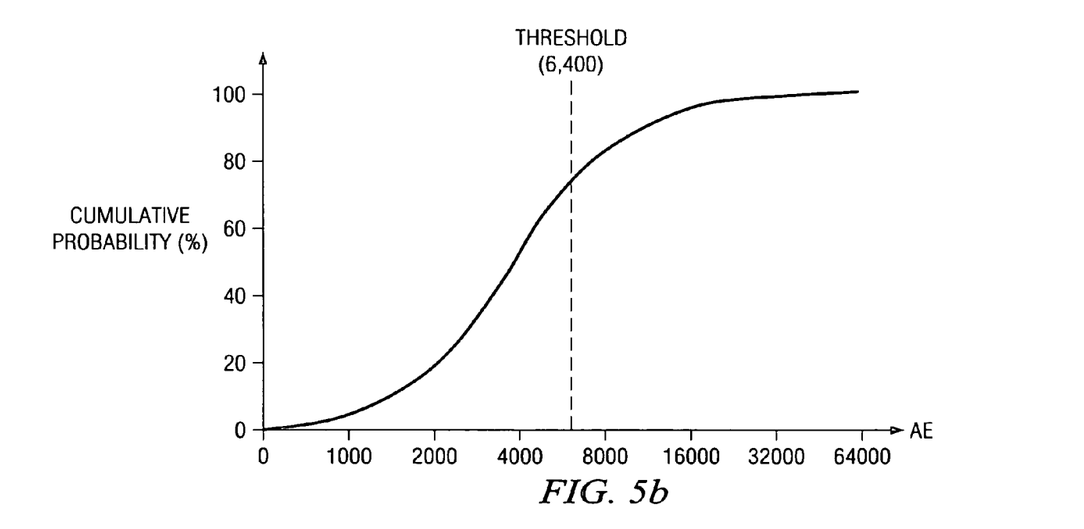

FIGS. 5a and 5b illustrate examples of the cumulative probability percentage versus absolute error value for respective "good" and "bad" distributions. The examples of FIGS. 5a and 5b show a threshold value of 6400 from a maximum absolute error for a total mismatch of 65,280 for a 16-by-16 macroblock with 255 color levels. If the ratio of candidate motion vectors that fail the first stage for further processing (No at decision block 405) is β, FIG. 5a shows a β of 80% and FIG. 5b shows a β of 24%. The discount ratio λ is the savings due to early termination. This discount ratio $\lambda=(1-\alpha)\beta$. If a=25% then for the "good" example of FIG. 5a λ is 60%. In the "bad" example of FIG. 5b, λ is 18%.

Employing process 400 for the "bad" example of FIG. 5b, the threshold value will decrease because candidate motion vectors with smaller absolute errors dominant. Each time MIN_AE resets, the threshold value decreases. Thus the quick convergence feedback enables disqualification of candidate motion vectors whose projected similarity ae1 is worse than this updated threshold. This decreases the threshold value and reduces the number of candidate motion vectors subject to a full cost function calculation. Accordingly, the discount ratio λ improves and more processing is saved.

Figure 6:
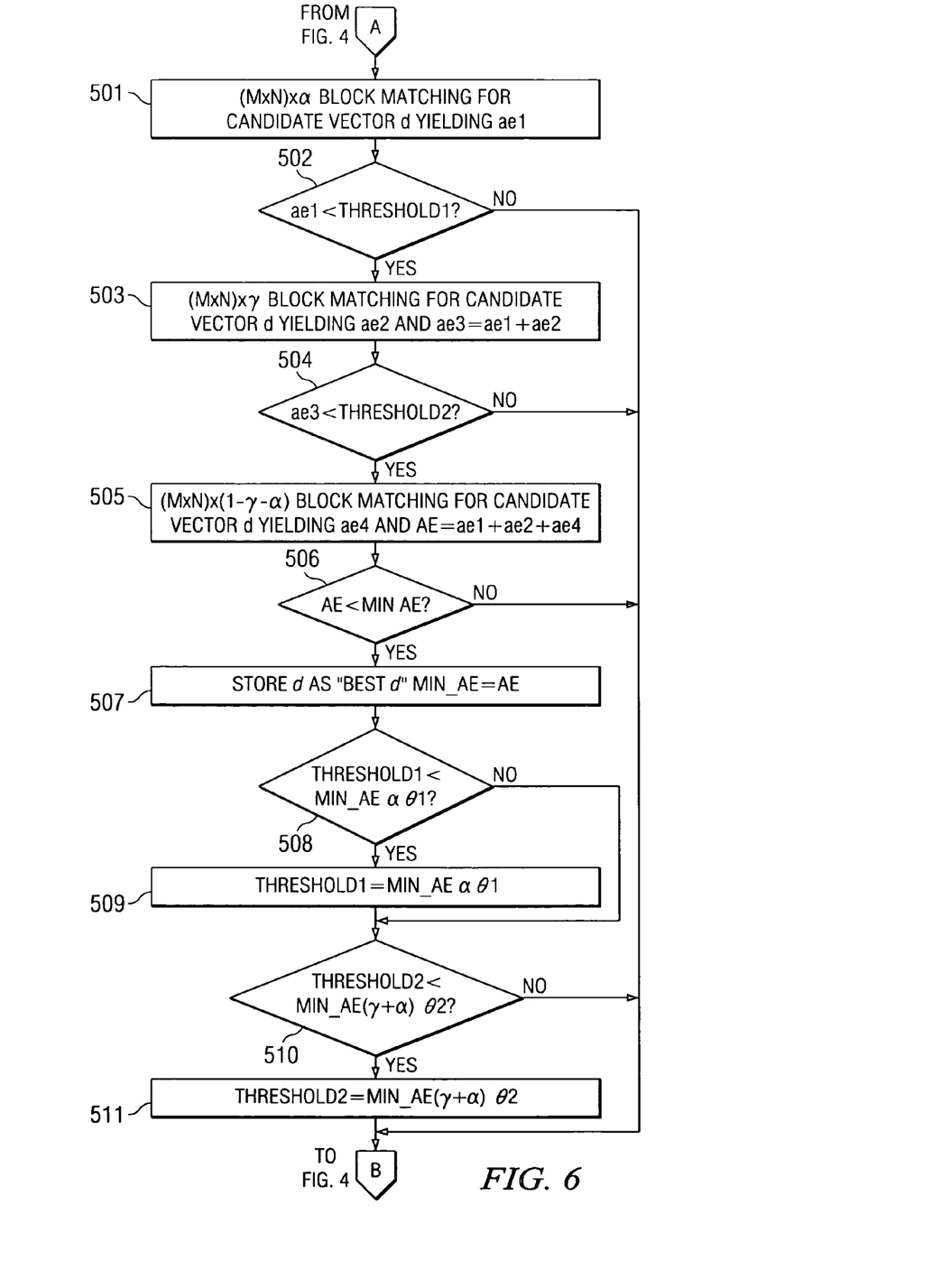
FIG. 6 is a flowchart of the block matching algorithm using a two stage early decision for goodness estimation and quick convergence feedback according to a third embodiment of this invention.

FIG. 6 illustrates a further alternative of this invention. Blocks 501 to 511 of FIG. 6 substitute for blocks 404 to 410 of FIG. 4. Block 501 computes the part of the cost function for the current macroblock at the current candidate motion vector d a fraction α of the M by N pixel macroblock, with 0<c<1. The result of calculation of the cost function for part of the macroblock is ae1. Decision block 502 tests to determine if ae1 is less than threshold1. If ae1 is not less than threshold1 (No at decision block 502), then process 400 branches forward to decision block 411 to check for more candidate motion vectors. If ae1 is less than threshold1 (Yes at decision block 502), then block 503 computes the cost function for a further fraction of γ remaining pixels. Note 0<γ<1 and α+γ<1. This yields a cost function result ae2 and a second intermediate cost function ae3=ae1+ae2. Decision block 504 tests to determine if ae3 is less than threshold2. If ae3 is not less than threshold1 (No at decision block 504), then process 400 branches forward to decision block 411 to check for more candidate motion vectors. If ae3 is less than threshold2 (No at decision block 504), then block 505 computes the cost function for the remaining (1−γ−α) pixels. Block 505 also computes the final cost function AE as the sum of the prior intermediate cost functions ae1, ae2 and ae4. Decision block 506 checks to determine if the cost function AE for the entire macroblock is less than the prior cost function minimum AE_MIN. If this is the case (Yes at decision block 506), then the current candidate motion vector d yields a better cost function than the previous best. Thus block 507 stores the current candidate motion vector d as the best candidate motion vector and replaces the prior cost function minimum AE_MIM with the current cost function AE. Decision block 508 tests to determine if threshold1 is greater than the product of the cost function minimum AE_MIN, α and a factor θ1, where θ1≧1. If this is the case (Yes at decision block 508), the threshold is reset to the product of AE_MIN, α and θ1 (block 509). Process 400 continues with decision block 411. If this is not the case (No at decision block 508), then decision block 510 tests to determine if threshold2 is greater than the product of the cost function minimum AE_MIN, the sum of γ+α and a factor θ2, where θ2≧1. If this is the case (Yes at decision block 510), the threshold is reset to the product of AE_MIN, the sum of γ+α and θ2 (block 511). Process 400 continues with decision block 411. If this is not the case (No at decision block 510), the process 400 continues with decision block 411.

The alternative process illustrated in FIG. 6 implements this invention in two stages. There are two early exit points in this algorithm. If the first stage intermediate cost function computation is less than threshold1 or if the second stage cost function computation is less than threshold2, then further calculation for that candidate motion vector is aborted. Only if both intermediate cost function computations pass their respective limits will the cost function be computed for the entire macroblock. Upon detection of a new minimum cost function, this alternative embodiment checks to determine if threshold1 and threshold2 are to be updated. Depending on the particular numbers, either one or both may be updated. Thus the intermediate cost functions for later candidate motion vectors must pass stricter intermediate tests.

What is claimed is:

1. A method of temporal video compression converting a video consisting of a sequence of consecutive pictures into a compressed video by motion compensation comprising the steps of:

dividing each picture of the sequence of consecutive pictures into a plurality of two-dimensional macroblocks of M horizontal pixels by N vertical pixels;

estimating the motion of each macroblock in each picture of the sequence of consecutive pictures as compared to a reference frame via block matching including the steps of:

calculating a preliminary value of a cost function between a predetermined fraction of pixels in a candidate macroblock as displaced by a candidate motion vector and the corresponding pixels of reference macroblock;

determining whether said preliminary value of said cost function is less than a predetermined threshold;

if said preliminary value of said cost function is not less than said predetermined threshold, advancing to a next candidate motion vector;

if said preliminary value of said cost function is less than said predetermined threshold calculating a final value of said cost function between all pixels in said candidate macroblock as displaced by said candidate motion vector and the corresponding pixels of reference macroblock, determining if said final value of said cost function is less than a prior cost function minimum, if said final value of said cost function is not less than said prior cost function minimum, advancing to a next candidate motion vector, and if said final value of said cost function is less than said prior cost function minimum, setting the current candidate motion vector as the best candidate motion vector and setting the prior cost function minimum to said final value of said cost function, then advancing to a next candidate motion vector;

upon consideration of all possible candidate motion vectors setting a motion vector for said macroblock to said best candidate motion vector; and coding the compressed video employing motion compensation dependent upon said motion vectors determined by said block matching.

2. The method of temporal video compression of claim 1, wherein:

said predetermined fraction of pixels in the candidate macroblock is 30%.

3. The method of temporal video compression of claim 1, wherein:

said predetermined fraction of pixels in the candidate macroblock is 25%.

4. The method of temporal video compression of claim 1, wherein:

said predetermined fraction of pixels in the candidate macroblock is 12.5%.

5. The method of temporal video compression of claim 1, wherein:

said step of advancing to a next candidate motion vector includes advancing to a new candidate motion vector in a search of all possible motion vectors.

6. The method of temporal video compression of claim 1, further comprising the step of:

updating said predetermined threshold.

7. The method of temporal video compression of claim 6, wherein:

said step of updating said predetermined threshold includes setting said predetermined threshold to the product of said final value of said cost function, said predetermined fraction and a safe margin factor greater than or equal to 1 upon determining said final value of said cost function is less than said prior cost function minimum.

8. The method of temporal video compression of claim 7, wherein:
said safe margin factor has a value between 1.00 and 1.25.

9. A method of temporal video compression converting a video consisting of a sequence of consecutive pictures into a compressed video by motion compensation comprising the steps of:
dividing each picture of the sequence of consecutive pictures into a plurality of two-dimensional macroblocks of M horizontal pixels by N vertical pixels;
estimating the motion of each macroblock in each picture of the sequence of consecutive pictures as compared to a reference frame via block matching including the steps of:
calculating a first preliminary value of a cost function between a first predetermined fraction of pixels in a candidate macroblock as displaced by a candidate motion vector and the corresponding pixels of reference macroblock;
determining whether said first preliminary value of said cost function is less than a first predetermined threshold;
if said first preliminary value of said cost function is not less than said first predetermined threshold, advancing to a next candidate motion vector;
if said first preliminary value of said cost function is less than said first predetermined threshold
calculating a second preliminary value of said cost function between a second predetermined fraction of pixels in a candidate macroblock as displaced by a candidate motion vector and the corresponding pixels of reference macroblock, said second predetermined fraction being greater than said first predetermined fraction;
determining whether said second preliminary value of said cost function is less than a second predetermined threshold;
if said second preliminary value of said cost function is not less than said second predetermined threshold, advancing to a next candidate motion vector;
if said first preliminary value of said cost function is less than said first predetermined threshold and said second preliminary value of said cost function is less than said second predetermined threshold
calculating a final value of said cost function between all pixels in said candidate macroblock as displaced by said candidate motion vector and the corresponding pixels of reference macroblock,
determining if said final value of said cost function is less than a prior cost function minimum,
if said final value of said cost function is not less than said prior cost function minimum, advancing to a next candidate motion vector, and
if said final value of said cost function is less than said prior cost function minimum, setting the current candidate motion vector as the best candidate motion vector and setting the prior cost function minimum to said final value of said cost function, then advancing to a next candidate motion vector;
upon consideration of all possible candidate motion vectors setting a motion vector for said macroblock to said best candidate motion vector; and
coding the compressed video employing motion compensation dependent upon said motion vectors determined by said block matching.

10. The method of temporal video compression of claim 9, further comprising the steps of:
updating said first predetermined threshold; and
updating said second predetermined threshold.

11. The method of temporal video compression of claim 10, wherein:
said step of updating said first predetermined threshold includes setting said first predetermined threshold to the product of said final value of said cost function, said first predetermined fraction and a first safe margin factor greater than or equal to 1 upon determining said final value of said cost function is less than said prior cost function minimum; and
said step of updating said second predetermined threshold includes setting said second predetermined threshold to the product of said final value of said cost function, said second predetermined fraction and a second safe margin factor greater than or equal to 1 upon determining said final value of said cost function is less than said prior cost function minimum.

12. The method of temporal video compression of claim 11, wherein:
each of said first and second safe margin factors has a value between 1.00 and 1.25.

* * * * *